UNITED STATES PATENT OFFICE.

OSCAR S. OAKS, OF SOUTH RUTLAND, NEW YORK.

IMPROVEMENT IN ROOFING-CEMENT.

Specification forming part of Letters Patent No. 23,108, dated March 1, 1859.

*To all whom it may concern:*

Be it known that I, OSCAR S. OAKS, of South Rutland, in the county of Jefferson and State of New York, have invented a new and Improved Mastic Compound for the Protection of Roofs from the Weather; and I do hereby declare that the following is a full, clear, and exact description of the same.

To make my improved mastic compound, I take twenty-five gallons of coal-tar, two gallons of boiled linseed-oil, two gallons of india-rubber solution, two gallons of alkaline solution of shellac, five pounds of asphaltum, five pounds of soapstone, (pulverized,) five pounds of litharge, five pounds of sulphate of baryta, (pulverized,) five pounds of plaster-of-paris, and I place the whole in a kettle or other suitable vessel over a fire and boil till thoroughly mixed, stirring from time to time during the boiling process. The compound thus obtained is in condition for immediate use; or it may be put up in barrels or other vessels for transportation.

The best method of using the compound is as follows: While it still remains warm from the boiling, or after a subsequent warming, when it is not used before it has time to cool, it is applied to canvas or other cloth by putting said cloth into the vessel containing it and allowing it to remain therein till thoroughly saturated. After taking said cloth out of the compound it is passed through a bed of pulverized whiting, and said cloth is then in a condition to be spread over the roof, to which it should be secured by tacks. After the roof has been covered with the prepared cloth a thick coat of the compound should be applied to the outside of the cloth with a brush or by other means and immediately sprinkled all over with clean sand, and after this coat is dry another coat of the compound should be applied in the same manner, and this being covered with sand, as before, completes the roof, which is water-proof, fire-proof, and frost-proof.

The india-rubber solution hereinbefore specified is made by dissolving two (2) pounds of india-rubber in two (2) gallons of purified spirits of turpentine. The alkaline solution of shellac is made by putting three (3) pounds of shellac in a suitably-heated vessel with two (2) gallons of soft water, and adding, when the water boils, about a tea-spoonful of saleratus and continuing the boiling process for about five minutes after such addition, when the shellac will be dissolved.

An important feature in my compound is the use of an alkaline solution of shellac in place of the alcoholic solution commonly used in roofing compounds, by which I effect a very considerable saving in the expense. Another important feature is the use of the sulphate of baryta, in combination with the other matters employed, to give "body" to the compound, that material (sulphate of baryta) giving so great a degree of hardness and durability to the compound.

What I claim as my invention, and desire to secure by Letters Patent, is—

The employment, in combination with the other substances herein specified, of the alkaline solution of shellac and the sulphate of baryta, the whole being compounded substantially as and in about the proportions herein set forth.

OSCAR S. OAKS.

Witnesses:
    ALLEN WALDO,
    SIMEON OAKS.